US007735059B2

(12) United States Patent
Darst et al.

(10) Patent No.: US 7,735,059 B2
(45) Date of Patent: Jun. 8, 2010

(54) WINFORMS CONTROL HOSTING IN UNMANAGED APPLICATIONS

(75) Inventors: Geoffrey Charles Darst, Snoqualmie, WA (US); Eric Hyde Carter, Kirkland, WA (US); Michael Shneerson, Redmond, WA (US); Stephen James Styrchak, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1191 days.

(21) Appl. No.: 11/148,620

(22) Filed: Jun. 9, 2005

(65) Prior Publication Data

US 2006/0282817 A1    Dec. 14, 2006

(51) Int. Cl.
 G06F 9/44    (2006.01)
(52) U.S. Cl. .................. 717/106; 717/109; 717/113; 715/234
(58) Field of Classification Search ......... 717/106–113; 715/234
 See application file for complete search history.

(56) References Cited

U.S. PATENT DOCUMENTS 5,835,914 A * 11/1998 Brim .................. 707/206
6,263,492 B1 * 7/2001 Fraley et al. ............. 717/107
6,353,923 B1 * 3/2002 Bogle et al. .............. 717/128
2002/0070977 A1 * 6/2002 Morcos et al. ............ 345/810
2002/0083415 A1 * 6/2002 Jazdzewski ............... 717/111
2005/0198610 A1 * 9/2005 Fildebrandt .............. 717/100

OTHER PUBLICATIONS

Pour, G.; Moving toward component-based software development approach; 1998; IEEE, pp. 296-300.*
Clay Shannon; C#Builder WinForm Application Development Tutorial; 2003; Embarcadero Technologies pp. 1-6.*

* cited by examiner

*Primary Examiner*—Wei Y Zhen
*Assistant Examiner*—Satish Rampuria
(74) *Attorney, Agent, or Firm*—Woodcock Washburn LLP

(57) ABSTRACT

Systems and methods for hosting managed code controls within unmanged hosts, such as MICROSOFT Word and Excel. There are two components to the hosting architecture, a wrapper control that implements various interfaces and a container control that hosts the managed code control. A design-time implementation allows for a designer to drag and drop managed code controls onto documents that run in a design component process. A runtime component allows managed code controls to run within hosts under security permissions specified by a policy.

20 Claims, 4 Drawing Sheets

WINFORMS CONTROL HOSTING IN UNMANAGED APPLICATIONS

FIELD OF THE INVENTION

This invention relates in general to the field of software development. More particularly, this invention relates to a system and method for providing reusable and customizable components in a managed code environment.

BACKGROUND OF THE INVENTION

Prior to the release of MICROSOFT.NET technologies, MICROSOFT ACTIVEX controls were a preferred technology for creating reusable components. One use of ACTIVEX controls is document hosting. Applications (such as MICROSOFT Excel and MICROSOFT Word) provided a design-time environment that allows end users to add ACTIVEX controls to a document, and through user interface elements (such as a property browser), define the behavior and attributes of the control. The applications also provided a runtime environment whereby the control would execute. In addition, many applications provide a scripting language (e.g., MICROSOFT VISUAL BASIC for Applications) which enables the end user to add code that would govern the ACTIVEX control's behavior at runtime. By supporting ACTIVEX controls, applications enabled a rich level of component use and customization by end users.

Unfortunately, the promise of ACTIVEX controls as reusable and customizable components on the document did not materialize. First, the controls themselves are extremely difficult and time consuming to develop. Second, the powerful customization that they offered is extremely susceptible to abuse. Documents containing ACTIVEX controls typically run the controls on load, which means that the mere act of opening a document makes end users vulnerable both to malicious controls and "good" controls being used in unintended and/or malicious ways.

With the advent of .NET, the WINDOWS Forms (WinForms) form package became available, which provides a way to create controls in managed code. Managed code is code that has its execution managed by the .NET Framework Common Language Runtime. WinForms controls can be easily created either from scratch or by extending an existing control. Because the controls are written in managed code, they run within constraints of the .NET Development Platform (NDP) security model, which makes them far less susceptible to abuse.

However, while WinForms controls eliminate the two disadvantages of their ACTIVEX counterparts, they cannot easily be hosted in unmanaged hosts (e.g., documents). The basic problem is that WinForms controls were designed to be hosted in Windows Forms, not on documents. WinForms controls expose the ACTIVEX interfaces that would enable them to be hosted in an ACTIVEX container, however, not all interfaces are provided. Most notably, IDataObject is missing, which means that WinForms controls cannot be cut, copied, or pasted. In addition, some of the existing implementation does not follow the rules of ACTIVEX. For example, WinForms controls do not support scaling. At runtime, the expected behavior is for such controls to deactivate if scaling is attempted. WinForms controls do not do this which results in poor behavior when hosts attempt to scale them.

In addition, the ACTIVEX implementation exposed by WinForms ensures that the control will be run immediately when a document is loaded. This is undesirable behavior because, as noted above, it means that opening a document may cause arbitrary code to run. Even though that code will run within the context of security policy, there is no guarantee that the user will be fully protected from all possible harm that could befall them, particularly if the user has granted full trust to any controls that are already installed on their machine.

Therefore, there is a need for a system of improving upon the WinForms ACTIVEX implementation, adding back the missing ACTIVEX implementation, and providing a mechanism for instantiating the managed control which occurs independently of document load and therefore can be accomplished in a secure way. The present invention provides solutions to this and other limitations in the prior art.

SUMMARY OF THE INVENTION

The present invention is directed to systems and methods for hosting managed code controls within unmanaged hosts, such as MICROSOFT Word and Excel. There are two components to the hosting architecture, a wrapper control that implements various interfaces and a container control that hosts the managed code control. A design-time implementation allows for a designer to drag and drop managed code controls onto documents that run in a design component process. A runtime component allows managed code controls to run within hosts under security permissions specified by a policy.

In accordance with an aspect of the invention, there is provided a method for hosting a managed control in an unmanaged host. The method includes placing the managed control on a document within the host; instantiating the managed control; loading a wrapper control on the document; instantiating a container control; and hosting the managed control within the container control.

According to a feature, during design-time, the method may include instantiating the container control and the managed control by a designer component. Code may be generated to instantiate and initialize the managed control at runtime.

According to another feature, during runtime, the method may include executing code within the document to instantiate the managed control and calling a runtime engine to locate the wrapper control on the document. The managed control may be run in an isolated environment. In addition, opening the document may result in the managed control executing to an extent allowed by a security policy, wherein the security policy preferably defaults to not executing the managed control.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

Exemplary Computing Environment

Figure 1:
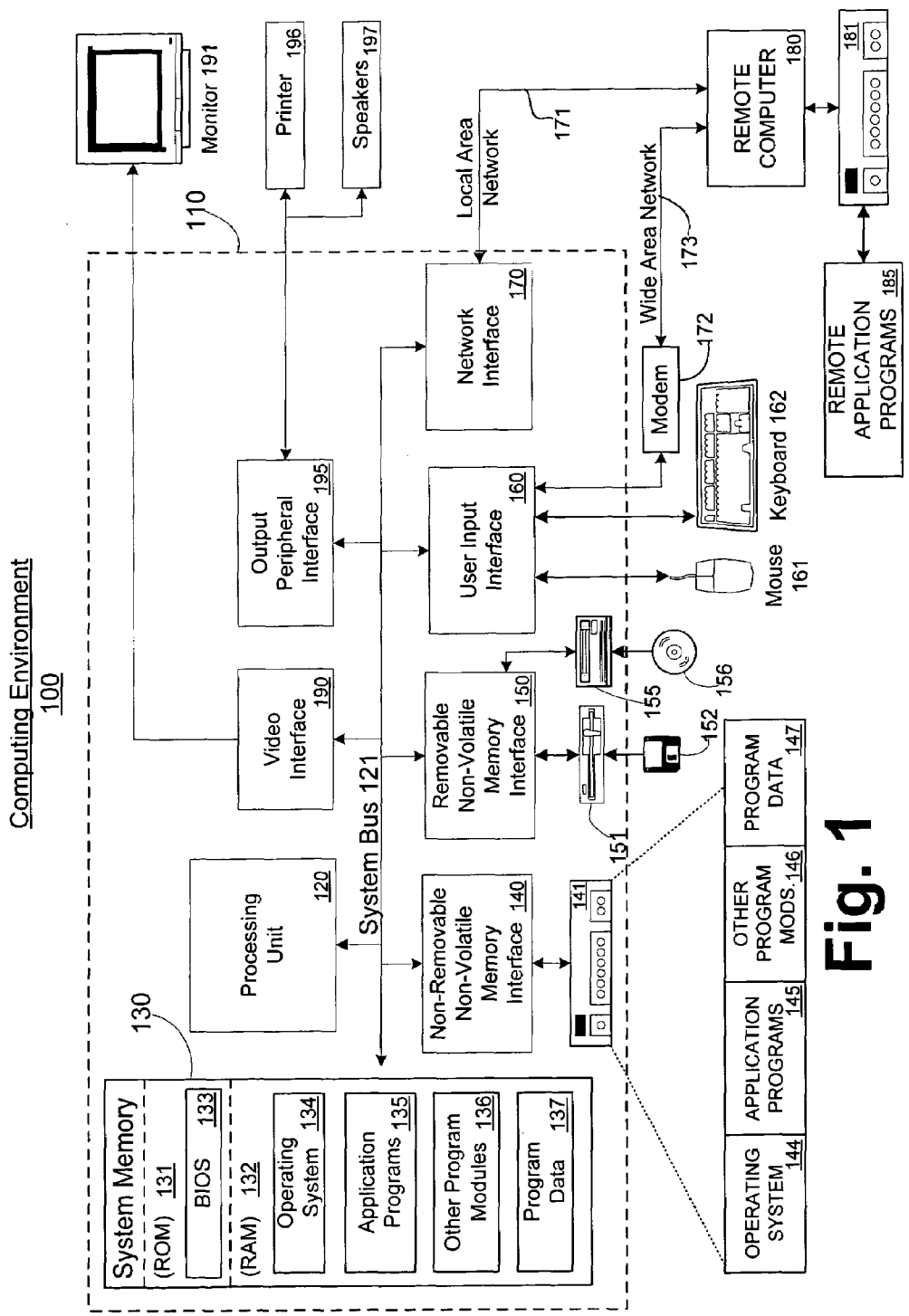
FIG. 1 is a block diagram showing an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 141 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Embodiments of WinForms Control Hosting in Unmanaged Applications

A "control" is a reusable shared component, which may have some design time UI. In the unmanaged world, the term "control" generally refers to a component built using specific ActiveX technologies. Unmanaged applications that host controls are in-place-activation containers that implement various interfaces that ActiveX controls depend upon to function properly. In a managed environment, the concept of a control is more nebulous. Managed applications with UI are built around forms packages (such as WinForms) and as such, reusable components are written specifically to interact with the forms package that they are intended to be used with. These controls are either Winforms controls distributed as part of the .NET technologies or a custom-built controls, i.e., user controls. Managed controls support ActiveX functionality to some limited extent, however, they do not fully support ActiveX functionality. The present invention implements an architecture that hosts managed controls in ActiveX containers (e.g., Word and Excel) by extending ActiveX implementation built into these controls. These controls aim to provide the whole range of functionality of the managed controls hosted on the Winforms.

Figure 2:
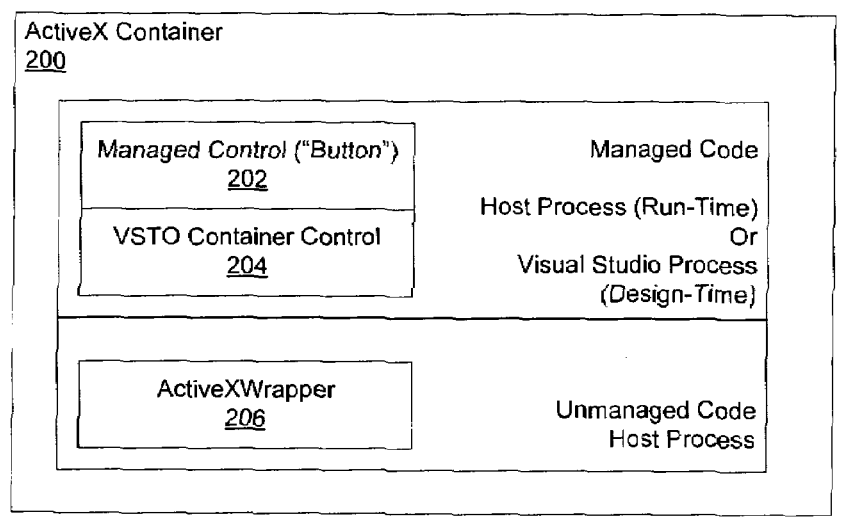
FIG. 2 illustrates the exemplary hosting architecture of the present invention.

Referring now to FIG. 2, the present invention provides for two components in the hosting architecture. The hosting architecture may be part of a larger architecture for enabling document customization using managed code. An ActiveX container 200 (e.g., an Excel sheet or Word Document) hosts an ActiveXWrapper control 206. The ActiveXWrapper control 206 is an ActiveX control that implements all of the required ActiveX interfaces. In some cases, the ActiveXWrapper 206 provides implementation, such as for methods that are missing or improperly handled by the WinForms implementation. In other cases, the ActiveXWrapper 206 delegates the call back to a VSTO Container control 204, described below.

The ActiveXWrapper 206 abstracts the managed control from the host. As far as the host is concerned, the ActiveXWrapper 206 is the control being hosted. This enables all hosts that currently host ActiveX controls to also host managed WinForms controls 202. The ActiveXWrapper 206 does not persist any of the data that is owned by the WinForms control. Instead, it persists enough information to identify the managed control that it wraps. A reason for this is security. Because the wrapper control is automatically loaded when the document is opened, it is preferable to reduce the chance of harm. Because loading the ActiveXWrapper 206 does not depersist arbitrary WinForm control data, nor does it actually load the WinForm control, thus the present invention advantageously provides additional safety in its implementation.

The second component of the architecture is the VSTO Container Control 204, which sits between the ActiveXWrapper control 206 and the WinForms control 202 being hosted. The VSTO Container Control 204 is an empty WinForms User Control, which by virtue of the fact that it is a WinForms control, exposes all of the ActiveX interface implementation provided by WinForms. This is the implementation that the ActiveXWrapper 206 delegates to whenever doing so is appropriate. In addition, the VSTO Container Control 204 exposes some private interfaces that facilitate communication to and from the ActiveXWrapper 206.

The VSTO Container Control 204 is the container for the WinForms control 202 that is being hosted. The document customization is responsible for pushing the WinForms control 202 into the container 204, and then pushing the container to the ActiveXWrapper 206. This work is done by code that is generated as part of the document customization which leverages functionality built into a runtime engine.

The VSTO Container Control 204 is derived from UserControl (which is derived from Form), which provides for message reflection. Message reflection is a technique that is used when wrapping an ActiveX Control around a Win32 control (i.e., the MICROSOFT WINDOWS API for developing 32-bit applications), and allows an ActiveX Control to intercept Win32 notifications and "reflect" them back to the Win32 control, thus informing the Win32 control to behave like an ActiveX control. This is used because Win32 controls use a different protocol for interacting with their host that is message based. Non-Form based controls do not implement message reflection themselves, because containing the WinForm control within the VSTO Container Control ensures correct behavior for WinForm controls that are wrapping Win32 controls.

The WinForms control's window is a child window of the VSTO Container Control's window which is sized to match and kept in sync. This results in a seamless visual display for the user as they are never aware that the WinForms control is actually contained by its parent.

An exemplary end to end control hosting scenario is as follows. First, the control 202 is placed on the document 200 at, e.g., design time. For example, In MICROSOFT VISUAL STUDIO Tools for Office 2005, the control 202 is placed on the document by dragging and dropping it via a toolbox item provided by Visual Studio. Drag and drop allows the host to persist the control via the ActiveXWrapper 206 to an IStorage using IDataObject. In this case what is persisted is the ActiveXWrapper 206 including the COM CLSID and the information that describes the type of control that should be hosted.

The host then instantiates the control via a well known COM means (i.e., CoCreateInstance). At this point, there is a loaded ActiveXWrapper 206 control on the document and nothing more. Next, is that the designer (which is in the VISUAL STUDIO process) is notified that a new control was added. The designer generates the code that will result in the control being loaded at runtime. In addition, it creates an instance of the VSTO container control 204, creates an instance of the WinForms control 202, parents the WinForms control 202 to the container 204, locates the ActiveXWrapper 206 in the host, and pushes the container control to the wrapper control in the host process. Properties are set in the Visual Studio property browser. Property persistence is achieved because the designer generates code to set the properties to the desired value when the control is initialized at runtime. At this point, the components are connects and WinForms control 202 is ready for use.

In the Visual Studio Tools For Office 2005 implementation, components may be connected differently depending on whether the host is in a design-time environment or instantiating the control at runtime. During design-time, when the control is placed on the document 200, a designer component instantiates the WinForms control 202 being hosted (as well as the VSTO Container Control 204) and makes the requisite calls to connect the components together. Additionally, the document designer generates the necessary code to instantiate and initialize the control at runtime. This includes generating code that will set the control's properties to the correct value. The designer component is part of Visual Studio Tools For Office 2005.

Figure 3:
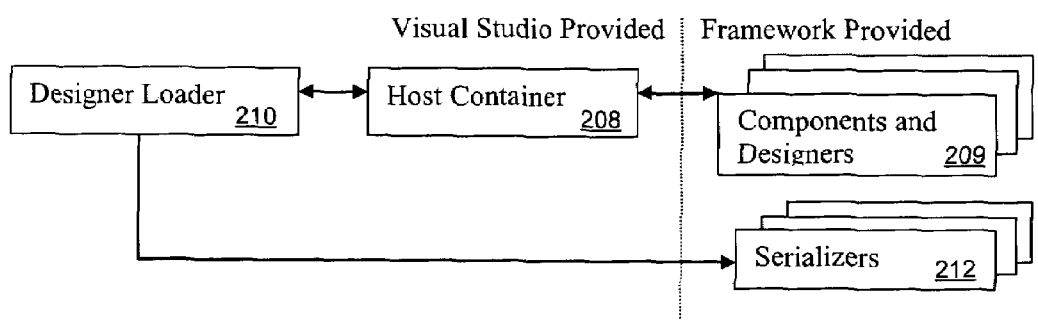
FIG. 3 illustrates a host container and the design-time process.

Referring to FIG. 3, in the design-time case, a Visual Studio host container 208 shown in the figure has many responsibilities. It is responsible for creating components, binding them to designers and providing services to the components and designers 209 it maintains. It is also responsible for loading designers from some sort of persistent state, and saving them back to that state. The host container 208 provides logic for undo, clipboard functions and many other services that the designers rely on to provide a robust design-time environment.

Visual Studio's host container 208 saves persistent state as source code in a user's project. The host container 208 consists of three parts: The Host Container, a Designer Loader 210 used to save and load the form design, and a group of serializers 210 provided by the actual components that work with the designer loader to perform the actual loading and saving of the form.

In the runtime case, the document 200 includes code that has been written by, e.g., a solutions developer and stored with the document 200. This code includes the designer generated code to instantiate the control. When this code executes, it creates the WinForms control 202, initializes the control with the persisted state, and then calls methods in the runtime engine that will actually locate the correct ActiveX-Wrapper controls 206 on the document. The VSTO Container Control 204 is created and all of the components are connected. The runtime engine component is part of Visual Studio Tools For Office 2005.

In the runtime case, the WinForms control 202 is created by and manipulated by the customization code which runs in a custom AppDomain (an application domain that is an isolated environment where applications execute) with its own security policy. This means that regardless of whether the control itself is fully trusted, control instantiation, initialization and execution will be limited by the security policy of the caller. Opening a document will only result in control code executing to the extent that the end-user is willing to trust the document. By default, no code will run, which means that the end user can safely open any document without fear of unknown and possibly malicious code running as a side-effect of that action.

In the event that security policy prevents code from running (and thus prevents controls from being instantiated) the ActiveXWrapper 206 control will still exist on the document 200. The user can elect to change policy to allow code to run on the document, at which point controls will resume functioning. To accomplish this, the document is reloaded after any changes are made to policy in order for those changes to enable controls.

Figure 4:
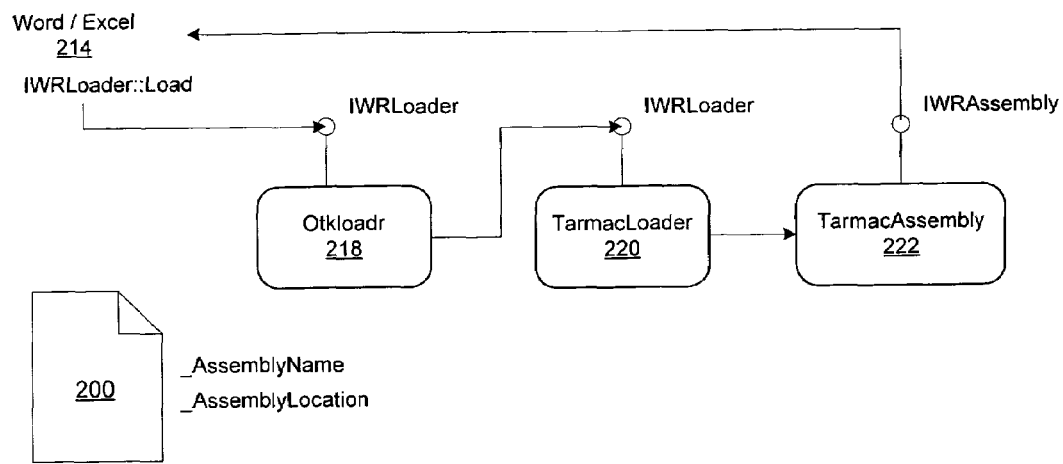
FIGS. 4-7 detail a runtime process in accordance with the present invention.

FIGS. 4-7 detail the runtime process in greater detail. It is noted that the runtime example is being provided for exemplary purposes only and do not serve to limit the scope of the claims of the present invention. The runtime process preferably includes four phases: Load, Startup, Load Runtime Storage Control (RSC) and Open Event. FIG. 4 illustrates the Load phase. Initially, the host (Word/Excel 214) checks for the existence of 2 custom properties: _AssemblyLocation and _AssemblyName. If the properties exist, the host 215 will co-create otkloadr 218 and call IWRLoader::Load. If the _AssemblyName property value is equal to '*', then otkloadr 218 recognizes that it relates to a customization and it then instantiates the runtime by co-creating TarmacLoader 220 and delegates the call to it. TarmacLoader 220 creates and returns to the caller a IWRAssembly pointer implemented by TarmacAssembly object 222 to MICROSOFT Office. It is preferred that customizations are not loaded yet at this point.

Figure 5:
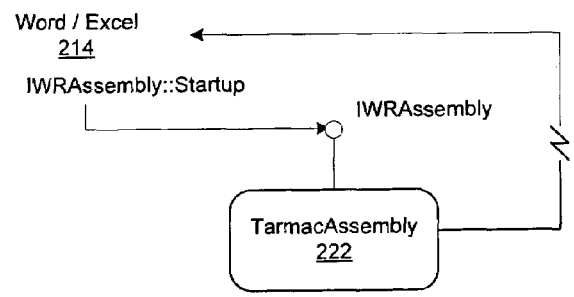
Figure 6:
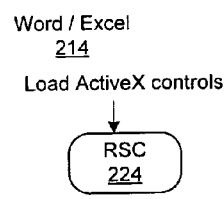

FIG. 5 illustrates the Startup phase. Here, the host 214 calls IWRAssembly::Startup passing pointers to the host's object model. TarmacAssembly 222 will subscribe itself to listen to the document's open event. Referring to FIG. 6, the host loads the Load Runtime Storage Control (RSC) 224, which is an ActiveX control that is added to the document when the project is built. At runtime this control 224 is loaded as part of the normal document loading sequence.

Figure 7:
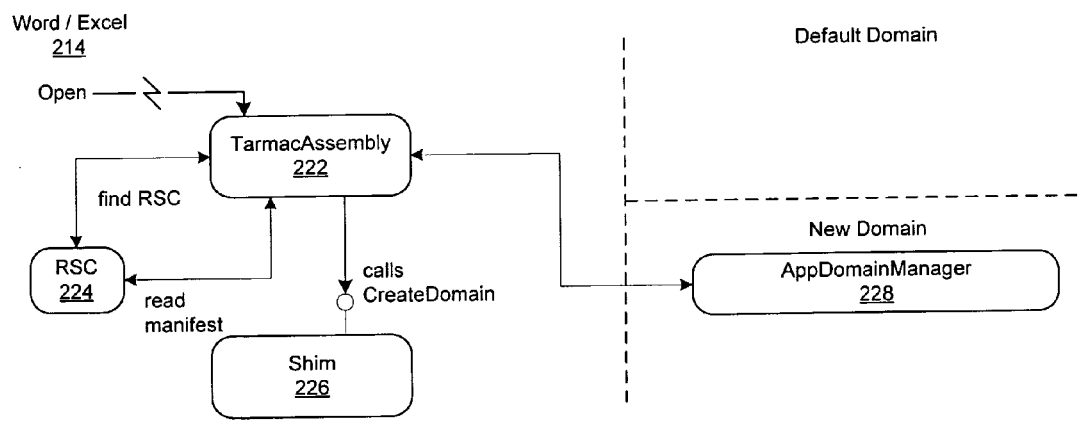

FIG. 7 illustrates the Open phase. The host will fire an Open event once it has finished loading the document 200. Because TarmacAssembly 222 subscribed to this event in the Startup phase, it will receive this event and this is where the actual loading of the customization takes place. First, TarmacAssembly 222 finds the RSC through the Office Operations Manager (OM), and then TarmacAssembly 222 reads the manifest from the RSC. TarmacAssembly 222 then co-creates a Common Language Runtime (CLR) shim 226 that implements activation and calls CreateDomain passing the manifest. The shim 226 extracts the code base, i.e., location of the assembly from the manifest. The shim 226 starts the CLR and creates Evidence for the new AppDomain based on the location (URL, etc). The shim 226 then creates a new AppDomain. The shim 226 loads Tarmac runtime in new AppDomain and creates AppDomainManager 228, which parses and updates the manifest.

The AppDomainManager 228 loops through the entry points in the manifest, and it for each entry point, loads the entry point's assembly and calls the entry point's static method CreateForClient. CreateForClient is a static method that creates an instance of the "Startup class" ("ThisDocument" for instance) and provides it with pointers to interfaces that will allow it to communicate to the host in order to initialize view controls and data caching. The call into Startup results in the managed controls being created and hooked up as well.

While the present invention has been described in connection with the preferred embodiments of the various Figs., it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method of hosting a managed code control in an unmanaged host, the method being implemented on a computing device where execution of the managed code control is managed within a common language runtime environment on the computing device and implementation of the unmanaged host is performed on the computing device external to the common language runtime environment thereon, the method comprising:
   providing a wrapper control ("wrapper") in a memory of the computing device that implements control interfaces and abstracts managed control of the managed code control from the unmanaged host, the wrapper control being managed external to the common language runtime environment on the computing device; and
   providing a container control in a memory of the computing device as an intermediary managed object that is a container for said managed code control, the container control being managed within the common language runtime environment on the computing device, the method comprising:
   determining that the managed code control has been placed on a document by way of the wrapper being provided in the unmanaged host;
   generating code that will result in the managed code control being loaded at runtime;
   creating the container control and the managed code control as correspondent entities of the placed wrapper;
   parenting the created managed code control to the container control so as to establish a relationship between the created managed code control and the container control within the common language runtime environment;
   locating the placed wrapper in the unmanaged host; and
   pushing the container control to the wrapper in the unmanaged host so as to establish a relationship between the container control and the wrapper and by extension between the created managed control within the common language runtime environment and the wrapper external to the common language runtime environment,
   the method further comprising the unmanaged host employing the placed wrapper in the unmanaged host and external to the common language runtime environment to employ the managed code control within the common language runtime environment by way of the container control within the common language runtime environment.

2. The method of claim 1, said wrapper providing implementation for methods.

3. The method of claim 1, said container control being an empty WinForms user control.

4. The method of claim 1, further comprising providing message reflection via said container control.

5. The method of claim 1, further comprising: providing said managed code control as a child window of said container control; and sizing and synchronizing said managed code control with said container control.

6. A method of hosting a managed control in an unmanaged host, the method being implemented on a computing device where execution of the managed control is managed within a common language runtime environment on the computing device and implementation of the unmanaged host is performed on the computing device external to the common language runtime environment thereon, the method comprising:
   placing said managed control on a document within said host;
   instantiating said managed control in a memory of the computing device; and
   loading a wrapper control on said document, the wrapper control being managed external to the common language runtime environment on the computing device, the method comprising:
   generating code that will result in the managed control being loaded at runtime;
   creating a container control and the managed control as correspondent entities of the loaded wrapper control, the container control being managed within the common language runtime environment on the computing device;
   parenting the created managed code control to the container control so as to establish a relationship between the created managed code control and the container control within the common language runtime environment;
   locating the placed wrapper in the unmanaged host; and
   pushing the container control to the wrapper in the unmanaged host so as to establish a relationship between the container control and the wrapper and by extension between the created managed control within the common language runtime environment and the wrapper external to the common language runtime environment,
   the method further comprising the unmanaged host employing the wrapper in the unmanaged host and external to the common language runtime environment to employ the managed control within the common language runtime environment by way of the container control within the common language runtime environment.

7. The method of claim 6, said placing said managed control on said document further comprising persisting said wrapper and in information that describes a type of managed control to be hosted.

8. The method of claim 6, further comprising:
   instantiating a container control; and
   hosting said managed control within said container control.

9. The method of claim 8, wherein during design-time, said method further comprises instantiating said container control and said managed control by a designer component.

10. The method of claim 9, further comprising generating code to instantiate and initialize said managed control at runtime.

11. The method of claim 8, wherein during runtime, said method further comprises:
- executing code within said document to instantiate said managed control;
- calling a runtime engine to locate said wrapper control on said document.

12. The method of claim 11, further comprising running said managed control in an isolated environment.

13. The method of claim 11, wherein opening said document results in said managed control executing to an extent allowed by a security policy.

14. The method of claim 13, wherein said security policy defaults to not executing said managed control.

15. A computer readable hardware medium having stored thereon computer instructions for hosting a managed control in an unmanaged host, where execution of the managed control is managed within a common language runtime environment on a computing device and implementation of the unmanaged host is performed on the computing device external to the common language runtime environment thereon, said instructions performing the method comprising:
- placing said managed control on a document as a wrapper control within said host, the wrapper control being managed external to the common language runtime environment on the computing device;
- instantiating said managed control;
- generating code that will result in the managed control being loaded at runtime;
- loading the wrapper control on said document;
- creating a container control and the managed control as correspondent entities of the placed wrapper, the container control being managed within the common language runtime environment on the computing device;
- parenting the created managed control to the container control so as to establish a relationship between the created managed code control and the container control within the common language runtime environment;
- pushing the container control to the wrapper in the unmanaged host so as to establish a relationship between the container control and the wrapper and by extension between the created managed control within the common language runtime environment and the wrapper external to the common language runtime environment; and
- hosting said managed control within said container control,
- the method further comprising the unmanaged host employing the placed wrapper in the unmanaged host and external to the common language runtime environment to employ the managed control within the common language runtime environment by way of the container control within the common language runtime environment.

16. The computer readable medium of claim 15, wherein during design-time, said computer readable medium further comprises instructions for instantiating said container control and said managed control by a designer component.

17. The computer readable medium of claim 16, further comprising instructions for generating code to instantiate and initialize said managed control at runtime.

18. The computer readable medium of claim 15, wherein during runtime, said computer readable medium further comprises instructions for:
- executing code within said document to instantiate said managed control;
- calling a runtime engine to locate said wrapper control on said document.

19. The computer readable medium of claim 18, further comprising instructions for running said managed control in an isolated environment.

20. The computer readable medium of claim 18, wherein opening said document results in said managed control executing to an extent allowed by a security policy, and wherein said security policy defaults to not executing said managed control.

* * * * *